US012499222B2

(12) United States Patent
Castrejon, III et al.

(10) Patent No.: US 12,499,222 B2
(45) Date of Patent: Dec. 16, 2025

(54) SYSTEMS AND METHODS FOR MACHINE INTERPRETATION OF SECURITY DATA VIA DYNAMIC CONSTRAINT SPECIFICATION MATRIX

(71) Applicant: BANK OF AMERICA CORPORATION, Charlotte, NC (US)

(72) Inventors: Tomas M. Castrejon, III, Fort Mill, SC (US); Christopher Daniel Birch, Tega Cay, SC (US); James J. Siekman, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 202 days.

(21) Appl. No.: 18/218,774

(22) Filed: Jul. 6, 2023

(65) Prior Publication Data

US 2025/0013741 A1   Jan. 9, 2025

(51) Int. Cl.
*G06F 21/55* (2013.01)
*G06N 20/00* (2019.01)

(52) U.S. Cl.
CPC ......... *G06F 21/554* (2013.01); *G06N 20/00* (2019.01); *G06F 2221/034* (2013.01)

(58) Field of Classification Search
None
See application file for complete search history.

(56) References Cited

U.S. PATENT DOCUMENTS

| | | | |
|---|---|---|---|
| 6,041,412 A | 3/2000 | Timson et al. | |
| 9,021,589 B2 * | 4/2015 | Anderson | G06F 21/566 |
| | | | 713/189 |
| 10,938,845 B2 | 3/2021 | Elsner et al. | |
| 11,003,767 B2 | 5/2021 | Mu et al. | |
| 11,030,054 B2 | 6/2021 | Dain et al. | |
| 11,036,867 B2 | 6/2021 | Bhatia et al. | |
| 11,080,718 B2 | 8/2021 | Wiig et al. | |
| 11,081,219 B1 | 8/2021 | Dods et al. | |
| 11,178,182 B2 | 11/2021 | Saxena et al. | |
| 11,297,078 B2 | 4/2022 | Johnson et al. | |
| 11,507,645 B1 | 11/2022 | Hawes et al. | |
| 11,568,285 B2 | 1/2023 | Sears et al. | |
| 2004/0128518 A1 | 7/2004 | Cavers et al. | |
| 2007/0030123 A1 | 2/2007 | Hoblit | |

(Continued)

*Primary Examiner* — Atta Khan
(74) *Attorney, Agent, or Firm* — Moore & Van Allen PLLC; Nicholas C. Russell

(57) ABSTRACT

The present invention encompasses systems, computer program products, and methods for machine interpretation of security data. It identifies various data sources providing metrics and parameters, which include system logs, network traffic data, user activity records, and application logs. The system retrieves these metrics and parameters through an application programming interface and transforms them from unstructured to structured data. This structured data is then featured and stored. A dynamic consolidated matrix, known as the Constraint Specification Matrix (CSM), is generated from these features. A machine learning model is trained to discern correlations and patterns within the CSM's features. Lastly, the system transmits instructions to present these correlations and patterns via a user interface on a user device, allowing for user-friendly visualization and interpretation of the analyzed security data.

20 Claims, 6 Drawing Sheets

(56) References Cited

U.S. PATENT DOCUMENTS

| | | |
|---|---|---|
| 2016/0162690 A1* | 6/2016 | Reith .................... G06F 21/577 |
| | | 726/25 |
| 2018/0018602 A1 | 1/2018 | Dimaggio et al. |
| 2019/0124117 A1 | 4/2019 | Swafford |
| 2019/0258807 A1 | 8/2019 | Dimaggio et al. |
| 2019/0394242 A1 | 12/2019 | Wig et al. |
| 2019/0394243 A1 | 12/2019 | Wiig et al. |
| 2020/0293946 A1 | 9/2020 | Sachan et al. |
| 2023/0082618 A1 | 3/2023 | Yamamoto et al. |
| 2023/0118017 A1* | 4/2023 | Raghuramu ........... G06N 20/00 |
| | | 726/23 |

* cited by examiner

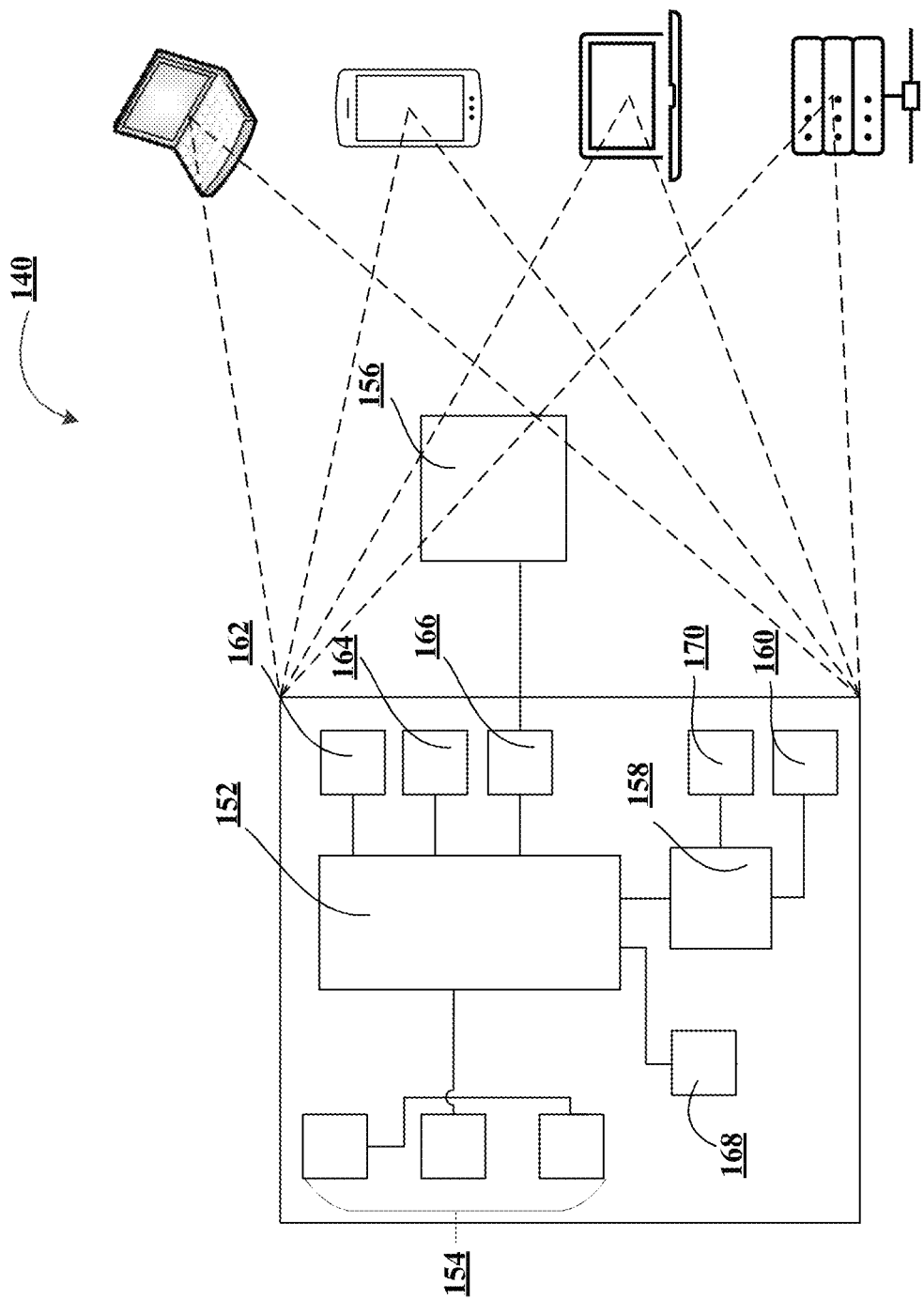

SYSTEMS AND METHODS FOR MACHINE INTERPRETATION OF SECURITY DATA VIA DYNAMIC CONSTRAINT SPECIFICATION MATRIX

TECHNOLOGICAL FIELD

Example embodiments of the present disclosure relate to systems and methods for machine interpretation of security data.

BACKGROUND

In a large computing environment with numerous interconnected end-point systems, it is crucial to gather diverse information, including system events, malware type events, and component malfunction events, to ensure comprehensive monitoring and timely detection of potentially unauthorized access, system errors, or data loss events.

Applicant has identified a number of deficiencies and problems associated with timely detection of potentially unauthorized access, system errors, or data loss events. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for machine interpretation of security data via use of dynamic constraint specification matrices. To facilitate the process of more efficient and effective detection of potentially unauthorized access, system errors, or data loss events within large computing environments, the present invention offers various systems and methods for employing data aggregators such as Security Information and Event Management (SIEM) systems, which collect, normalize, and correlate data from various sources, providing a centralized platform for security monitoring and analysis. By integrating Artificial Intelligence (AI) and Machine Learning (ML) techniques into the SIEM system, the present invention enhances entity ability to process large volumes of aggregated data, efficiently identifying patterns that could be indicative of potential threats, issues or anomalies.

While AI/ML techniques have proven effective in identifying patterns within large datasets, they often require external input to determine the significance of the identified patterns. Human expertise and domain-specific knowledge remain essential in interpreting the results generated by AI/ML models, discerning whether the detected patterns indicate potential threats, or anomalies. This collaboration between AI/ML systems and human analysts ensures a more comprehensive and accurate understanding of the computing environment's security landscape. By combining the strengths of AI/ML's processing capabilities with human intuition and contextual understanding, entities can employ the present invention to enhance overall security posture, allowing for more informed decisions and more effective response to potential issues and system vulnerabilities.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
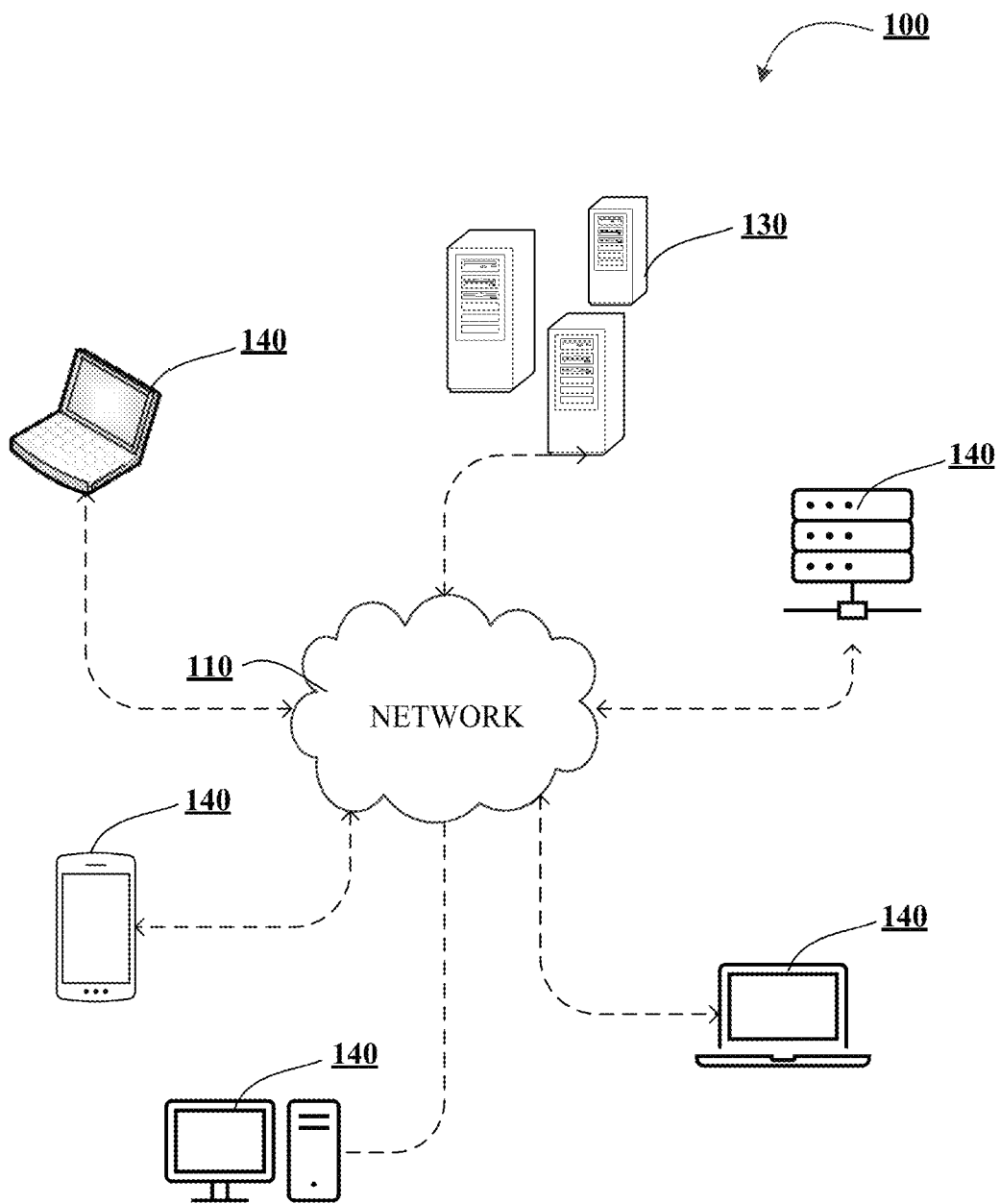
Figure 1B:
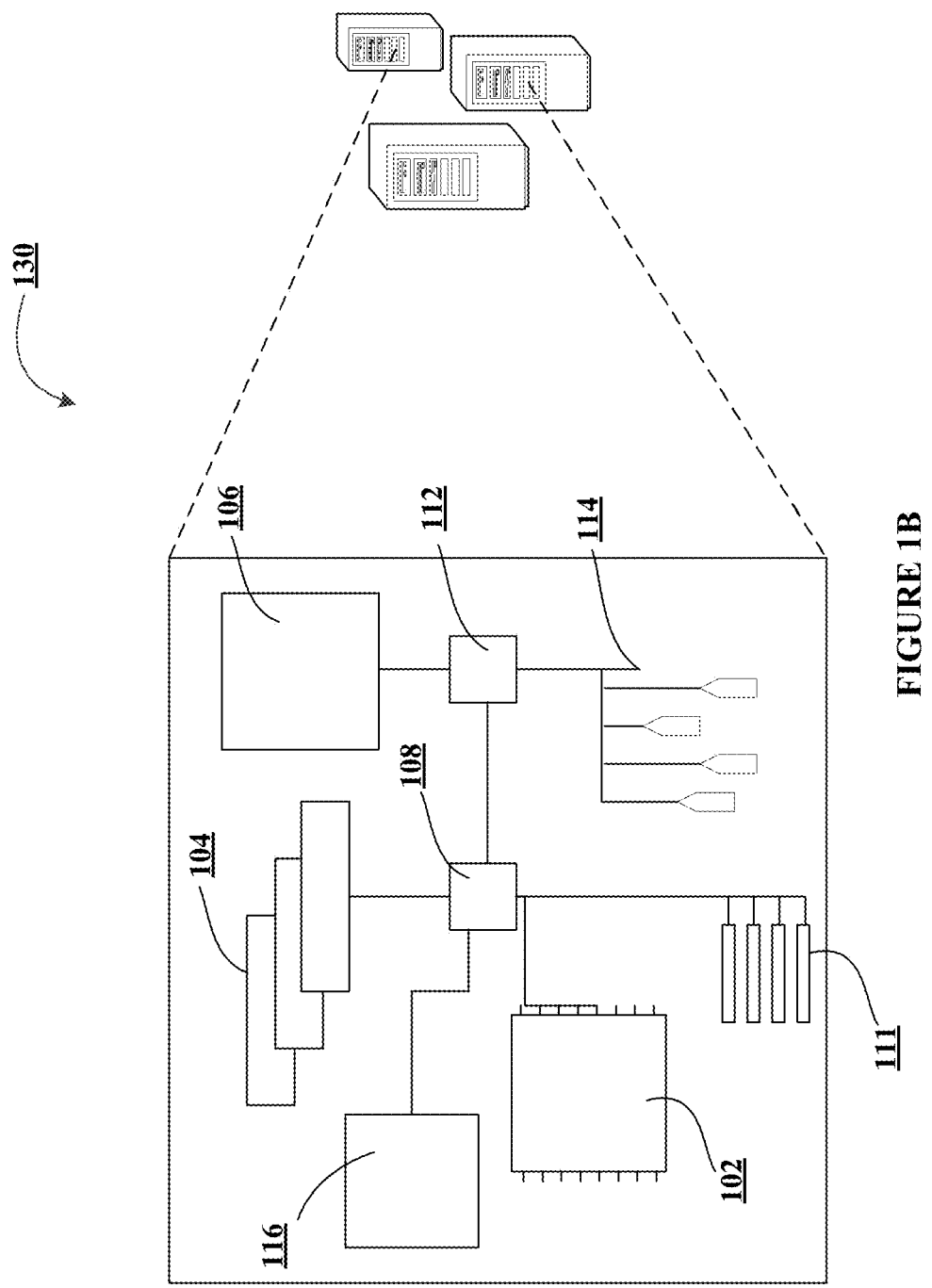
Figure 2:
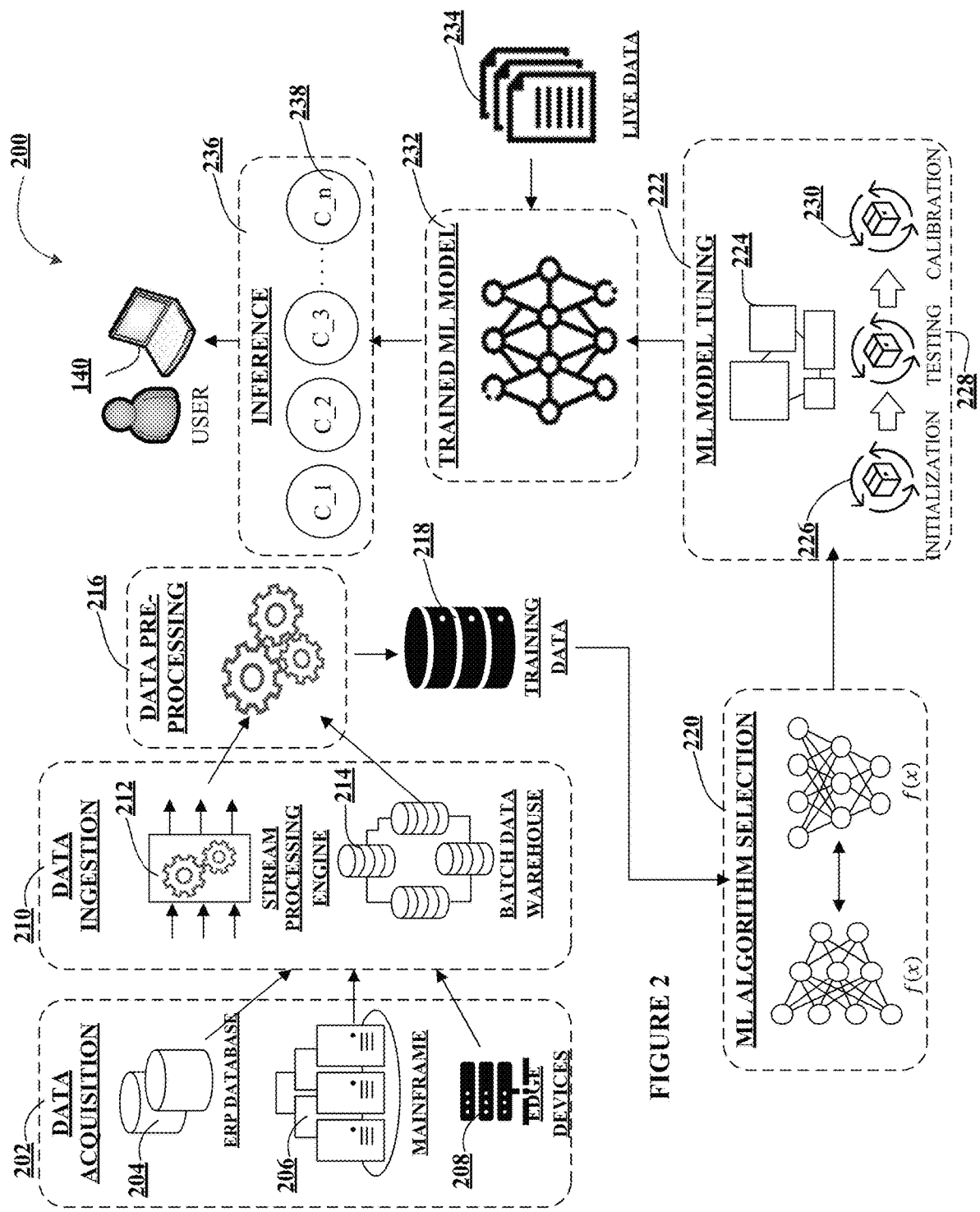
Figure 3:
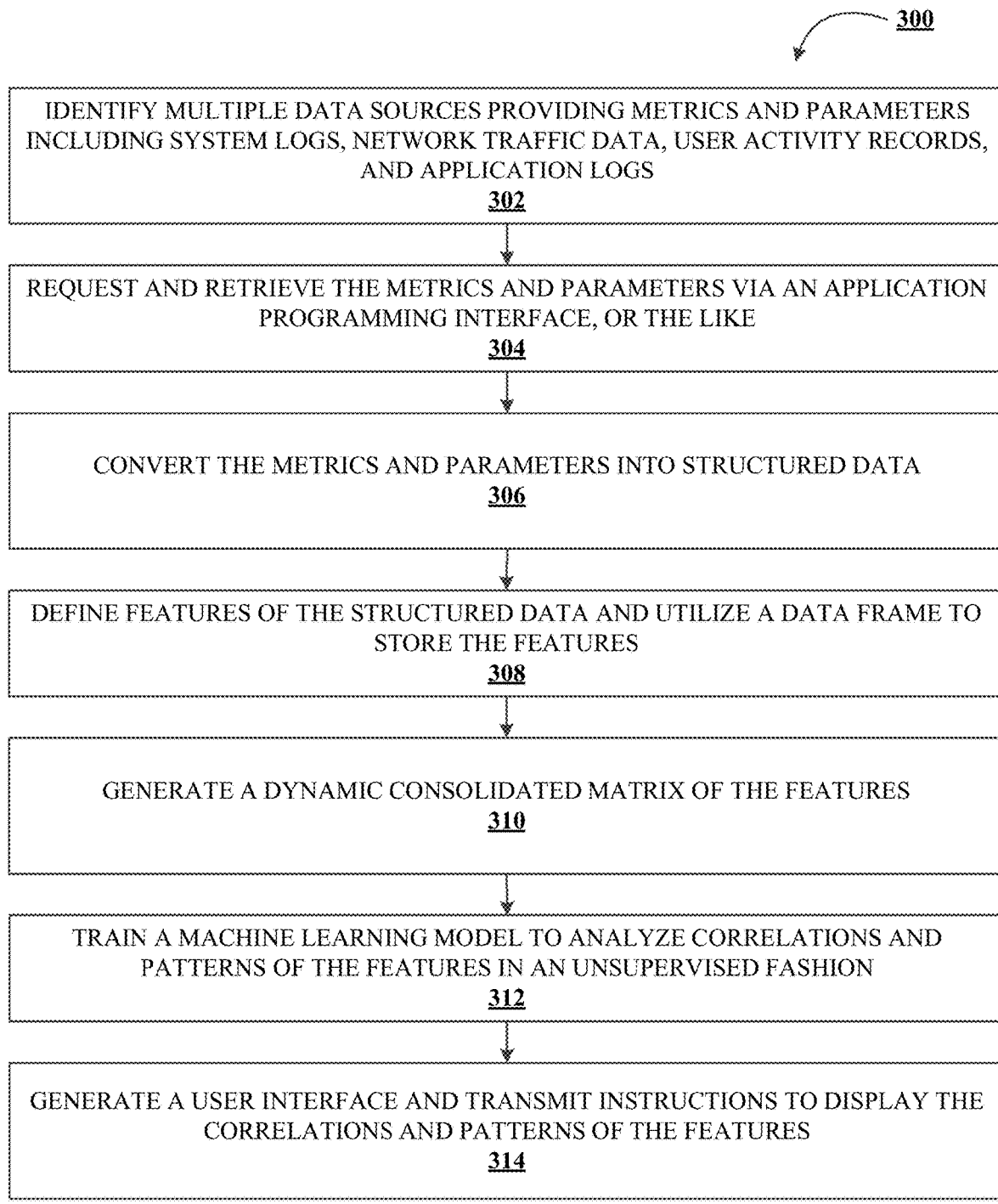
Figure 4:
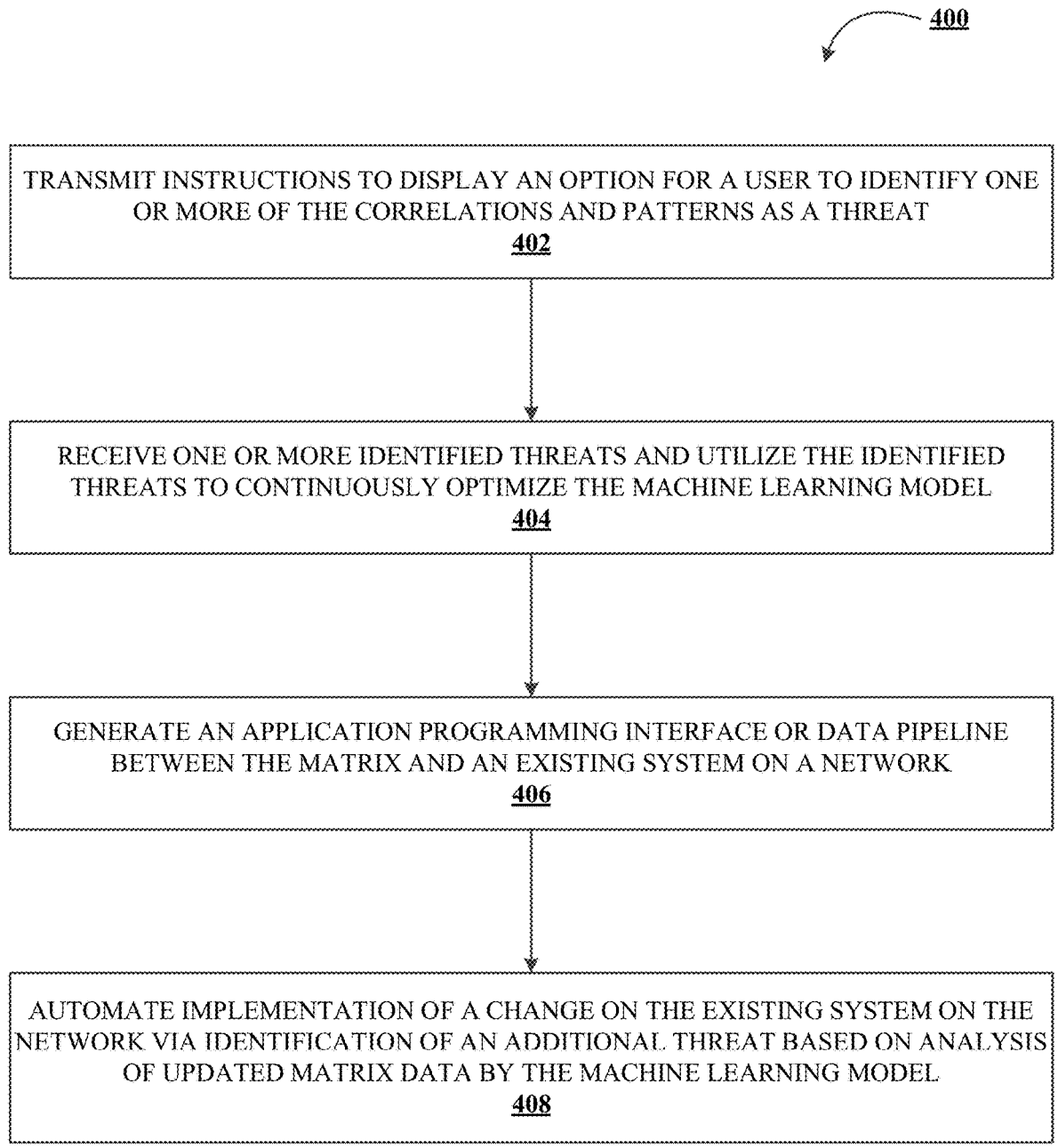

FIGS. 1A-1C illustrates technical components of an exemplary distributed computing environment for machine interpretation of security data via use of dynamic constraint specification matrices, in accordance with an embodiment of the disclosure;

FIG. 2 illustrates an exemplary machine learning (ML) subsystem architecture 200, in accordance with an embodiment of the invention;

FIG. 3 illustrates a process flow for machine interpretation of security data via use of dynamic constraint specification matrices, in accordance with an embodiment of the disclosure; and FIG. 4 illustrates an additional process flow for machine interpretation of security data via use of dynamic constraint specification matrices, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data. An "entity" can encompass a wide range of organizations, such as institutions, groups, associations, financial institutions, establishments, companies, unions, authorities, and similar entities. The common factor among these entities is their utilization of information technology resources for processing substantial amounts of data. As such, an "entity"

in this context denotes any organization or institution that employs information technology resources capable of processing large volumes of data, which can pertain to different aspects of the entity's operations.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, user authentication related information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device. Additionally, as used herein, a "resource" may also encompass computing or network resources. This broader definition of a resource includes elements such as computational power, storage capacity, network bandwidth, software applications, databases, virtual machines, servers, routers, switches, and other similar components associated with computing or network infrastructure.

As used herein, a "template" refers to a pre-formatted, customizable document or tool that provides a structured approach to identifying, evaluating, and addressing security threats. A security assessment template typically consists of a set of predefined sections, fields, or criteria that guide users through the process of conducting a comprehensive security or threat assessment. In some embodiments, each section of the template corresponds to a specific aspect or step of the assessment process. In some embodiments, a section includes fields for documenting the information or system components that the assessment covers. This may include hardware, software, data, networks, and human resources. In some embodiments, a section may include a list of users or document potential threats to each user. Threats could be anything that could utilize a vulnerability to cause harm to the system. In some embodiments, a section may include identifying data and documentation for potential vulnerabilities that threats could utilize. Vulnerabilities could range from weak passwords and out-of-date software to inadequate security policies or data storage methods. In some embodiments, a section may include fields for evaluating and rating the possibility or likelihood associated with each threat and vulnerability combination. In some embodiments, this involves considering the potential impact of the threat or vulnerability and the likelihood of it occurring. In some embodiments, a section may include documented strategies for mitigating each threat. This could include a range of actions from patching software vulnerabilities and improving security policies to investing in new security technologies. In some embodiments, a section may include an area to note when the assessment was conducted, who conducted it, and when it will be reviewed and updated next. In some embodiments, a section may include a starting point and can be customized according to the specific needs and context of an organization. By following a structured approach, security assessment templates help ensure that all relevant factors are considered, which leads to more accurate assessments and more effective mitigation strategies.

As used herein, an "artificial intelligence" (AI) system is a computing framework designed to perform tasks that normally require human intelligence, such as understanding natural language, recognizing patterns, problem-solving, and making decisions. It is understood that these systems operate by mimicking the neural networks of humans in a simplified form. In some embodiments, they may consist of interconnected layers of nodes, often referred to as artificial neurons, that process information using dynamic state responses to external inputs. They are trained by feeding them large volumes of data and adjusting the connections between the nodes using complex mathematical algorithms based on the principles of statistics and calculus, allowing them to learn from this data. In some embodiments, an AI system may be stored and executed in various ways depending on the requirements of the specific implementation. It is understood that AI systems can be hosted on local machines, in data centers, or in the cloud. It is further understood that cloud-based AI systems are becoming increasingly common due to their scalability, cost-effectiveness, and the ability to handle vast amounts of data. AI systems may be employed for identifying data patterns and vulnerability vectors due to their ability to analyze large and complex datasets rapidly and accurately.

As used herein "machine learning" (ML), a subset of AI, may be utilized in some embodiments. ML algorithms learn from the data they process, enabling them to discover hidden insights and patterns that may not be apparent to human analysts. For instance, in cybersecurity, AI systems can analyze network traffic to identify patterns consistent with cyber threats or vulnerabilities, providing an effective tool for proactively safeguarding systems and data. It is understood that there are several types of ML algorithms, each suited to different types of tasks. These include supervised learning where the algorithm learns from labeled training data, and then applies what it has learned to new data. In further embodiments, unsupervised learning may employ unlabeled data and learn by identifying patterns and structures within it. Additionally, in some embodiments, reinforcement learning may involve an algorithm that learns by interacting with its environment and receives rewards or demerits based on its actions. Furthermore, semi-supervised learning may include a blend of supervised and unsupervised learning wherein the invention employs the use of an algorithm which learns from a small amount of labeled data supplemented by a large amount of unlabeled data. Particularly regarding cybersecurity, ML may be used to identify patterns consistent with cyber vulnerabilities. The ML algorithm of the invention may analyze network traffic data, system logs, user behavior, or the like, and learn what "normal" activity looks like on an entity network infrastructure. Once the model has been trained on this data, it can then monitor network activity and identify anomalies or deviations from the normal pattern. These anomalies could potentially be cyber vulnerabilities, such as an intrusion, malicious activity, or use of a software vulnerability. This proactive approach to cybersecurity allows vulnerabilities to be detected and mitigated early, reducing the potential damage they may cause. In some embodiments, ML may provide valuable insights and automated decision-making capabilities across multiple entity communication channels.

In large computing environments with numerous interconnected end-point systems, it is crucial to gather diverse information, including system events, malware type events, and component malfunction events, to ensure comprehensive monitoring and timely detection of potentially unauthorized access, system errors, or data loss events. There are a number of deficiencies and problems associated with timely detection of potentially unauthorized access, system errors, or data loss events with respect to conventional solutions.

To facilitate the process of more efficient and effective detection of potentially unauthorized access, system errors, or data loss events within large computing environments, the present invention offers various systems and methods for employing data aggregators such as Security Information and Event Management (SIEM) systems, which collect, normalize, and correlate data from various sources, providing a centralized platform for security monitoring and analysis. By integrating Artificial Intelligence (AI) and Machine Learning (ML) techniques into the SIEM system, the present invention enhances entity ability to process large volumes of aggregated data, efficiently identifying patterns that could be indicative of potential issues or anomalies.

While AI/ML techniques have proven effective in identifying patterns within large datasets, they often require external input to determine the significance of the identified patterns. Human expertise and domain-specific knowledge remain essential in interpreting the results generated by AI/ML models, discerning whether the detected patterns indicate potential threats, or anomalies. This collaboration between AI/ML systems and human analysts ensures a more comprehensive and accurate understanding of the computing environment's security landscape. By combining the strengths of AI/ML's processing capabilities with human intuition and contextual understanding, entities can employ the present invention to enhance overall security posture, allowing for more informed decisions and more effective response to potential issues and system vulnerabilities.

Embodiments of the invention incorporate human expertise and domain-specific knowledge into a dynamic template with multiple parameters tailored to identify specific scenarios when a pattern is indicative of a system vulnerability. This dynamic template, referred to as a "Constraint Specification Matrix," can adapt to evolving landscapes, allowing entities to refine and adjust the parameters (e.g., vulnerability vectors, or the like) based on real-world experiences and emerging trends. By continuously updating and optimizing the Constraint Specification Matrix, entities can ensure that the AI/ML-based systems remain relevant and effective in detecting vulnerabilities and protecting against known vulnerabilities. This collaborative approach, combining the strengths of human intuition with the processing capabilities of AI/ML, creates a more robust and agile security posture, empowering entities to respond proactively to the ever-changing cybersecurity landscape.

The Constraint Specification Matrix template is system agnostic and serves as tool for evaluating the likelihood of a vulnerability occurring within any computing environment depending on the type of data generated by the computing environment. By incorporating a diverse array of parameters sourced from domain-specific knowledge, industry best practices, and real-time data analysis, the template enables entities to assess potential vulnerabilities with greater precision and accuracy.

In some embodiments, the invention leverages a Constraint Specification Matrix template that can be designed with a base set of parameters that apply to the computing environment, as well as temporary versions tailored to address significant changes, such as change in vulnerability vectors, code patches, version updates, or infrastructure modifications to the computing environment. These temporary versions incorporate parameters specific to the changes, enabling the entity to closely monitor and assess any potential vulnerabilities arising from the updates. Over time, these temporary versions can be phased out automatically based on predefined constraints indicating that the updated components have stabilized and integrated well with the overall computing environment. This flexible and adaptive approach ensures that the template remains relevant and effective in addressing both persistent and transient vulnerabilities.

Furthermore, in some embodiments, the invention offers the ability to customize the dynamic Constraint Specification Matrix to include parameters specific to a computing environment, ensuring a bespoke approach to security monitoring and vulnerability detection. In the context of access management and authentication, the data aggregator (e.g., a Business Rules Engine (BRE), or the like) can aggregate data related to login attempts, user privileges, and other relevant events from the computing environment. For example, each of these data elements may be retrieved from a System of Record (SOR) published by the computing environment. By employing AI/ML techniques, patterns within this data can be identified, offering insights into potential vulnerabilities, such as unauthorized access or privilege escalation attempts. The template's parameters, fine-tuned for the unique characteristics of the computing environment, can then be used to determine whether a detected pattern (e.g., toxic combination of access privileges, or the like) is indicative of a genuine vulnerability or simply a benign activity. Furthermore, the Constraint Specification Matrix can include parameters related to behavioral patterns of access privilege assignments across the computing environment, offering insights into specific actions executed by users to provide other users (or themselves) access to resources within the computing environment that may indicate malfeasant action. This adaptive and context-aware approach enables entities to focus their security efforts more effectively, enhancing their ability to proactively detect and respond to potential vulnerabilities in a timely manner.

Additionally, embodiments of the invention may employ AI/ML to identify a likelihood of a case contributing to a loss based on a database of historical cases. By utilizing case data (e.g., date, geographic location, line of business, communication channel, or the like) from historical cases that are known to have caused a loss, AI/ML models can analyze historical patterns and trends to predict potential vulnerabilities. User input labeling known cases that resulted in a loss can help train the AI/ML models, enhancing their accuracy and effectiveness in identifying cases with a high percentage likelihood of vulnerability manifestation. The output generated by these models is a likelihood score that indicates the probability of a case contributing to a loss, enabling organizations to preempt the need for mitigation. By proactively addressing cases with high likelihood scores before they escalate into actual losses, entities can optimize their vulnerability management strategies, reduce financial exposure, and maintain a more secure and resilient operational environment.

In order to effectively initiate remedial actions based on the likelihood of a case contributing to a loss, a threshold can be assigned to serve as a decision-making criterion. This threshold value represents a specific level of likelihood that the entity deems significant enough to warrant intervention. By comparing the likelihood scores generated by the AI/ML models against the predefined threshold, organizations can determine whether a case's likelihood level necessitates immediate remedial action. This approach ensures that resources are allocated efficiently and that remedial actions are focused on cases that pose the greatest vulnerability to the entity's financial stability and operational integrity. Additionally, the threshold value can be fine-tuned over time based on changing landscapes and entity priorities, enabling a more agile and adaptive vulnerability management strategy.

What is more, the present disclosure provides a technical solution to a technical problem. As described herein, the technical problem includes the difficulty in identifying and managing vulnerabilities in complex and dynamic computing environments, which often results in delayed responses to potential vulnerabilities, leading to security breaches, financial losses, and operational disruption.

The technical solution presented herein allows for the use of a dynamic, AI/ML-based system that continuously adapts to changing landscapes and optimizes its performance based on real-world experiences and emerging trends. This system employs a Constraint Specification Matrix, a tool that combines human expertise and domain-specific knowledge with machine learning capabilities to accurately identify vulnerability vectors and predict potential system vulnerabilities. In particular, this AI/ML-based system is an improvement over existing solutions to the problem of vulnerability detection and management. It accomplishes this (i) with fewer steps to achieve the solution, thus reducing the amount of computing resources, such as processing resources, storage resources, network resources, and/or the like, that are being used, (ii) providing a more accurate solution to the problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources.

Furthermore, the technical solution described herein uses a rigorous, computerized process to perform specific tasks and/or activities that were not previously performed. In specific implementations, the technical solution bypasses a series of steps previously implemented, thus further conserving computing resources. The introduction of the dynamic Constraint Specification Matrix as an adaptable tool in the workflow represents a significant leap forward, as it streamlines the process of vulnerability detection and enables a more proactive and precise approach to cybersecurity management.

The use of a AI/ML-based system that continuously adapts to changing landscapes and optimizes its performance based on real-world experiences and emerging trends in order to verify network security, as described herein, represents an improvement over conventional security protocols, by discerning correlations and patterns within a dynamic constraint matrix's features and presenting these correlations and patterns via a user interface on a user device, allowing for user-friendly visualization and interpretation of the analyzed security data, thereby yielding a tangible technological benefit. Specifically, the claimed system is less vulnerable to hacking or other similar security threats than conventional systems.

Additionally, the receipt, correlation, and enhancement of data via the dynamic Constraint Specification Matrix as an adaptable tool in the workflow as described herein enables load distribution by allowing data to be stored at individual data sources in a distributed manner. Previous systems require that all applicable information is hosted at one central location, which requires massive databases and increases network traffic as data continuously flows from each data source to the central server. In contrast, the distributed storage described herein reduces network congestion with its ability to monitor data from multiple different channels, while still allowing the data to be accessible as needed to achieve the features and functions of the system. One of ordinary skill in the art will appreciate that the system utilizes actual data of the system as it is monitored, rather than relying on additionally generated data metrics or metadata, which results in an efficient approach reducing the load on the entity system as compared to conventional solutions.

FIGS. 1A-1C illustrate technical components of an exemplary distributed computing environment 100 for machine interpretation of security data via use of dynamic constraint specification matrices, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes. It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for machine interpretation of security data via use of dynamic constraint specification matrices, in accordance with an embodiment of the disclosure. Embodiments of the invention incorporate human expertise and domain-specific knowledge into a dynamic template with multiple parameters tailored to identify specific scenarios when a pattern is indicative of a system vulnerability. This dynamic template, referred to as a "Constraint Specification Matrix," can adapt to evolving landscapes, allowing entities to refine and adjust the parameters (e.g., vulnerability vectors, or the like) based on real-world experiences and emerging trends. By continuously updating and optimizing the Constraint Specification Matrix, entities can ensure that the AI/ML-based systems remain relevant and effective in detecting vulnerabilities and protecting against known vulnerabilities. This collaborative approach, combining the strengths of human intuition with the processing capabilities of AI/ML, creates a more robust and agile security posture, empowering entities to respond proactively to the ever-changing cybersecurity landscape.

The Constraint Specification Matrix template is system agnostic and serves as tool for evaluating the likelihood of a vulnerability occurring within any computing environment depending on the type of data generated by the computing environment. By incorporating a diverse array of parameters sourced from domain-specific knowledge, industry best practices, and real-time data analysis, the template enables entities to assess potential vulnerabilities with greater precision and accuracy.

In some embodiments, the invention leverages a Constraint Specification Matrix template that can be designed with a base set of parameters that apply to the computing environment, as well as temporary versions tailored to address significant changes, such as change in vulnerability vectors, code patches, version updates, or infrastructure modifications to the computing environment. These temporary versions incorporate parameters specific to the changes, enabling the entity to closely monitor and assess any potential vulnerabilities arising from the updates. Over time, these temporary versions can be phased out automatically based on predefined constraints indicating that the updated components have stabilized and integrated well with the overall computing environment. This flexible and adaptive approach ensures that the template remains relevant and effective in addressing both persistent and transient vulnerabilities.

As shown in block 302, the process begins whereby the system identifies multiple data sources providing metrics and parameters including system logs, network traffic data, user activity records, application logs, or the like. The system performs this step with the goal of identifying the parameters and metrics to be included in the Constraint Specification Matrix (CSM). It is understood that the parameters and metrics, in some embodiments, are based on a combination of domain-specific knowledge, industry best practices, and real-time data analysis. As shown in block 304, the process continues by requesting and retrieving the metrics and parameters. In some embodiments, once features and metrics are identified, the system may use appropriate application programming interfaces (APIs) or software development kits (SDKs) to collect this data. Using Python, for instance, the system may use requests or urllib to pull data from a representational state transfer (REST) API.

As further shown in in block 306, the system converts the metrics and parameters into structured data. This step involves converting raw data into a format that is usable for the model. This could involve creating new features from existing ones (feature engineering), normalizing numerical data, encoding categorical data, or the like. Shown in block 308, the system then defines the features of the structures data and stores the features. The suitable data format for analysis largely depends on the nature of the data, the specific analysis you intend to perform, and the tools or libraries planned for use. However, in some embodiments, structured formats like CSV, JSON, or XML are may be used depending on the systems that the invention is interfacing with and monitoring. CSV (Comma Separated Values) is a simple and widely used format that stores tabular data (numbers and text) in plain-text form. One of ordinary skill will understand the relative ease of importing and exporting CSV data from spreadsheet software and databases. CSV is also straightforward to handle in most programming languages. JSON (JavaScript Object Notation) is a lightweight data-interchange format often used when data is sent from a server to a web page. JSON objects are simple to analyze and manipulate in many programming languages such as JavaScript.

XML (eXtensible Markup Language) is a markup language that defines a set of rules for encoding documents in a format that is both human-readable and machine-readable, as such the invention may utilize XML for the representation of arbitrary data structures, such as those used in web services. For analysis in languages like Python, the pandas library can be used to efficiently handle data in all of the above formats by the invention. This allows for conversion of these formats into a DataFrame, a 2-dimensional labeled data structure with columns of potentially different types. When dealing with larger datasets that may not fit into memory, some embodiments may utilize formats like Parquet or HDF5. These formats allow efficient reading of chunks of data at a time, which is more memory-friendly for larger datasets.

One of ordinary skill will appreciate that after preprocessing and feature engineering, the next logical step is to define these features as parameters in the code. For instance, in embodiments utilizing Python, the system may define these as variables or use a data structure like a dictionary or a DataFrame to store these parameters. As indicated in block 310, the Constraint Specification Matrix (CSM) is then generated by consolidating these parameters. Depending on the specific requirements and the number of parameters, this could be a simple 2-dimensional matrix or a more complex data structure in some embodiments. In some embodiments of this invention, the Constraint Specification Matrix (CSM) may be represented as a simple two-dimensional matrix. This structure, often referred to as a grid of values, allows each row to represent an instance and each column to signify a parameter. The invention could accomplish this using various data types such as arrays or lists in many programming languages, or employing more complex data structures like a DataFrame in Python.

In other embodiments, the relationships between parameters might necessitate a more intricate structure. For example, if parameters exhibit hierarchical relationships, if parameters are interconnected in a non-tabular manner, or if there is a requirement to track temporal relationships between various instances, then a more complex data structure may be employed. Such complex structures may include multi-dimensional arrays, graphs, trees, or even custom data structures. These structures may require advanced methods for creation, management, and processing. More advanced data manipulation libraries or frameworks may also be leveraged. For instance, in Python, the invention might utilize NumPy to generate multi-dimensional arrays, or libraries like NetworkX to produce and manipulate graph data structures. The invention can also create custom data structures using classes in Python. In some embodiments, the selection of data structure will hinge on the specific requirements of the CSM, the complexity and relationships of the parameters, and the types of analyses and operations that will be conducted on the data.

Next, the process includes training a machine learning model to analyze correlations and patterns of the features in an unsupervised fashion, as show in in block 312. In this way, the system implements AI/ML models that can process and analyze the parameters defined in the CSM. This involves designing and training models that can understand the correlations and patterns among different parameters, and that can update themselves based on these evolving correlations. In some embodiments, this includes a combination of supervised and unsupervised learning. For instance, unsupervised learning may be utilized to identify initial patterns and correlations in the CSM, while supervised learning may be implemented once a user or developer has reviewed the initial output of the analysis and determined certain patterns or correlations to be associated with threats or vulnerabilities on the network or system. Finally, as shown in block 314, the system may generate a user interface and transmit instructions to display the correlations and patterns of the features.

In the context of unsupervised learning, the system does not require prior knowledge about potential threats or vulnerabilities. Instead, the algorithms search for patterns and correlations in the CSM data, such as clusters of similar instances or outliers that may represent unusual behavior. This ability to explore the data without preconceived notions allows the system to potentially uncover previously unknown or unexpected threats. While unsupervised learning algorithms form a critical part of this system's functionality, there may also be a role for supervised learning methods. In certain embodiments, the system employs a hybrid approach that incorporates both unsupervised and supervised learning algorithms. For example, after unsupervised learning algorithms have identified initial patterns and correlations in the CSM, a user or developer may review the outputs of this analysis. Upon this review, the user or developer may identify patterns or correlations associated with known threats or vulnerabilities on the network or system. These recognized patterns can then serve as labelled data for supervised learning algorithms. The supervised learning component of the system can use this labelled data to build models that are better equipped to detect and predict these known threats or vulnerabilities in future data. The system's flexibility and adaptability are demonstrated through this blend of unsupervised and supervised learning algorithms. This powerful combination of learning methods allows the system to effectively handle both known and potential threats, bolstering the security of the network or system it is safeguarding. As the final step in this process, block 314 illustrates how the system generates a user interface and transmits instructions to display the identified correlations and patterns of the features. This user interface presents an effective and intuitive method for users to interact with, understand, and act upon the insights gleaned from the machine learning analysis of the CSM.

FIG. 4 illustrates an additional process flow for machine interpretation of security data via use of dynamic constraint specification matrices, in accordance with an embodiment of the disclosure. As shown in block 402, the process includes transmitting instructions to display an option for a user to identify one or more of the correlations and patterns as a threat. In this way, human experts may utilize the system to review the data output by the machine learning model to identify the correlations and patterns as a threat or vulnerability. This data is then fed back to the machine learning model in a supervised training manner. Next, as shown in block 404, the process continues by receiving one or more identified threats and utilizing the identified threats to continuously optimize the machine learning model as new threats are identified and as new data is sources from various systems or datastores by the CSM.

As such, once the CSM has been designed and optimized, the system may integrate it into the existing infrastructure, as shown in block 406. In some embodiments, this may involve setting up APIs, data pipelines, or other means of communication between the CSM and other systems. Monitoring the performance of the CSM and making necessary adjustments based on its performance and the evolving threat landscape further involves regular reviews by both the AI/ML models and human experts, ensuring that the matrix remains relevant and effective in identifying and responding to potential threats. As shown in block 408, the system may automate implementation of a change on the existing system on the network via identification of an additional threat based on analysis of updated matrix data by the machine learning model.

As noted, embodiments of the system operate by creating a Constraint Specification Matrix (CSM) interface that is designed for compatibility with existing infrastructure. This interface may be structured as a RESTful Application Programming Interface (API), allowing other systems to exchange data with the CSM. These APIs could be built with well-known frameworks, for instance, Flask or Django in Python. An endpoint is provided through which systems can send data to, and receive data from, the CSM. Once the API is set up, it is integrated into the existing infrastructure. Modifications to parts of the system are done to facilitate data transfer between the CSM and other systems. The method of data transfer depends on the existing system's architecture and could involve HTTP requests, webhooks, or message queues.

Post-integration, performance monitoring mechanisms are implemented. This includes systems for logging and metric collection. Libraries such as 'logging' for logging or 'prometheus_client' for metrics collection may be utilized in some embodiments. In addition, systems are implemented to enable updates to the CSM based on its performance and changes in the threat landscape. These updates might involve retraining the AI/ML models, modifying parameters of the CSM, or adjusting the system interface. The system also includes a mechanism to automate the implementation of changes based on the analysis of updated matrix data by the machine learning model. For instance, if an additional threat is identified, the system takes predefined steps to mitigate this threat. These steps could involve programmatically updating firewall rules, adjusting system settings, or triggering other security measures. Libraries such as 'os' or 'subprocess' may be used for interacting with the system, or APIs provided by other system components may be utilized in some embodiments. It is understood that the system operates in continuous iterations and refinements driven by ongoing monitoring, regular reviews by AI/ML models, and real-world experiences in the evolving threat landscape. This ensures the relevancy and effectiveness of the CSM in identifying and responding to potential threats.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for machine interpretation of security data, the system comprising:
    a processing device;
    a non-transitory storage device containing instructions when executed by the processing device, causes the processing device to perform the steps of:
        identify multiple data sources providing metrics and parameters including system logs, network traffic data, user activity records, and application logs;
        request and retrieve the metrics and parameters from the multiple data sources via an application programming interface;
        convert the metrics and parameters from unstructured data into structured data;
        define features of the structured data and store the features;
        generate a dynamic consolidated matrix of the features, wherein the dynamic consolidated matrix comprises at least one base matrix for base vulnerability vectors and a temporary matrix for new vulnerability vectors;
        train a machine learning model and analyze correlations and patterns of the features, via the machine learning model; and
        transmit instructions to display the correlations and patterns of the features via a user interface of a user device.

2. The system of claim 1, wherein the system is further configured to:
    transmit instructions to display an option for a user to identify one or more of the correlations and patterns as a threat;
    receive one or more identified threats and utilize the identified threats to continuously optimize the machine learning model;
    generate an application programming interface or data pipeline between the matrix and an existing system on a network; and
    automate implementation of a change on the existing system on the network via identification of an additional threat based on analysis of updated matrix data by the machine learning model.

3. The system of claim 1, wherein the machine learning model is further trained to consolidate features of the dynamic consolidated matrix via a dimensionality reduction method comprising one of a principal component analysis, partial least squares regression, Sammon mapping, multidimensional scaling, and projection pursuit.

4. The system of claim 1, wherein the dynamic consolidated matrix comprises a multi-dimensional array tracking temporal data along with the features.

5. The system of claim 1, wherein the machine learning model is an unsupervised machine learning model with no prior knowledge about potential threats or vulnerabilities and is programmed to search for patterns and correlations in the dynamic consolidated matrix, including clusters of similar instances and outliers representing unusual behavior.

6. The system of claim 1, wherein the machine learning model further comprises a supervised learning algorithm trained to use labelled data to detect and predict known threats or vulnerabilities in data.

7. The system of claim 1, wherein the system is further configured to automate implementation of changes to a network component based on analysis of updated dynamic consolidated matrix data by the machine learning model.

8. A computer program product for machine interpretation of security data, the computer program product comprising a non-transitory computer-readable medium comprising code causing an apparatus to:
    identify multiple data sources providing metrics and parameters including system logs, network traffic data, user activity records, and application logs;
    request and retrieve the metrics and parameters from the multiple data sources via an application programming interface;
    convert the metrics and parameters from unstructured data into structured data;
    define features of the structured data and store the features;
    generate a dynamic consolidated matrix of the features, wherein the dynamic consolidated matrix comprises at least one base matrix for base vulnerability vectors and a temporary matrix for new vulnerability vectors;
    train a machine learning model analyze correlations and patterns of the features, via the machine learning model; and
    transmit instructions to display the correlations and patterns of the features via a user interface of a user device.

9. The computer program product of claim 8, wherein the code further causes the apparatus to:
    transmit instructions to display an option for a user to identify one or more of the correlations and patterns as a threat;
    receive one or more identified threats and utilize the identified threats to continuously optimize the machine learning model;
    generate an application programming interface or data pipeline between the matrix and an existing system on a network; and automate implementation of a change on the existing system on the network via identification of an additional threat based on analysis of updated matrix data by the machine learning model.

10. The computer program product of claim 8, wherein the machine learning model is further trained to consolidate features of the dynamic consolidated matrix via a dimensionality reduction method comprising one of a principal component analysis, partial least squares regression, Sammon mapping, multidimensional scaling, and projection pursuit.

11. The computer program product of claim 8, wherein the dynamic consolidated matrix comprises a multi-dimensional array tracking temporal data along with the features.

12. The computer program product of claim 8, wherein the machine learning model is an unsupervised machine learning model with no prior knowledge about potential threats or vulnerabilities and is programmed to search for patterns and correlations in the dynamic consolidated matrix, including clusters of similar instances and outliers representing unusual behavior.

13. The computer program product of claim 8, wherein the machine learning model further comprises a supervised learning algorithm trained to use labelled data to detect and predict known threats or vulnerabilities in data.

14. The computer program product of claim 8, wherein the code further causes the apparatus to: automate implementation of changes to a network component based on analysis of updated dynamic consolidated matrix data by the machine learning model.

15. A method for machine interpretation of security data, the method comprising:
   identifying multiple data sources providing metrics and parameters including system logs, network traffic data, user activity records, and application logs;
   requesting and retrieving the metrics and parameters from the multiple data sources via an application programming interface;
   converting the metrics and parameters from unstructured data into structured data;
   defining features of the structured data and store the features;
   generating a dynamic consolidated matrix of the features, wherein the dynamic consolidated matrix comprises at least one base matrix for base vulnerability vectors and a temporary matrix for new vulnerability vectors;
   training a machine learning model analyze correlations and patterns of the features, via the machine learning model; and
   transmitting instructions to display the correlations and patterns of the features via a user interface of a user device.

16. The method of claim 15, wherein the method further comprises:
   transmitting instructions to display an option for a user to identify one or more of the correlations and patterns as a threat;
   receiving one or more identified threats and utilize the identified threats to continuously optimize the machine learning model;
   generating an application programming interface or data pipeline between the matrix and an existing system on a network; and
   automating implementation of a change on the existing system on the network via identification of an additional threat based on analysis of updated matrix data by the machine learning model.

17. The method of claim 15, wherein the machine learning model is further trained to consolidate features of the dynamic consolidated matrix via a dimensionality reduction method comprising one of a principal component analysis, partial least squares regression, Sammon mapping, multidimensional scaling, and projection pursuit.

18. The method of claim 15, wherein the dynamic consolidated matrix comprises a multi-dimensional array tracking temporal data along with the features.

19. The method of claim 15, wherein the machine learning model is an unsupervised machine learning model with no prior knowledge about potential threats or vulnerabilities and is programmed to search for patterns and correlations in the dynamic consolidated matrix, including clusters of similar instances and outliers representing unusual behavior.

20. The method of claim 15, wherein the machine learning model further comprises a supervised learning algorithm trained to use labelled data to detect and predict known threats or vulnerabilities in data.

* * * * *